United States Patent [19]

Bauer

[11] Patent Number: 5,733,179
[45] Date of Patent: Mar. 31, 1998

[54] METHOD AND APPARATUS FOR RECONDITIONING DIGITAL RECORDING DISCS

[76] Inventor: Jason Bauer, 534 W. Pepper, Mesa, Ariz. 85201

[21] Appl. No.: 779,772

[22] Filed: Jan. 7, 1997

Related U.S. Application Data

[62] Division of Ser. No. 415,734, Apr. 3, 1995, Pat. No. 5,593,343.

[51] Int. Cl.⁶ .................. B24B 1/00; B24B 7/30
[52] U.S. Cl. .................. 451/41; 451/59; 451/63
[58] Field of Search ................... 451/41, 57, 58, 451/60, 63, 59, 242, 246, 254, 255, 256, 259, 446, 451

[56] References Cited

U.S. PATENT DOCUMENTS

| | | | |
|---|---|---|---|
| 2,106,442 | 1/1938 | Stevens | 15/21 |
| 3,601,932 | 8/1971 | Elliott et al. | 451/28 |
| 3,841,031 | 10/1974 | Walsh | 451/41 |
| 3,860,399 | 1/1975 | Noble et al. | 451/41 |
| 3,943,666 | 3/1976 | Dion et al. | 451/254 X |
| 4,179,852 | 12/1979 | Barnett | 451/290 |
| 4,347,689 | 9/1982 | Hammond | 451/28 |
| 4,428,165 | 1/1984 | Dholakia | 451/41 |
| 4,481,741 | 11/1984 | Bouladon et al. | |
| 4,680,893 | 7/1987 | Crokhite et al. | 451/67 |
| 4,766,702 | 8/1988 | Kinner | 451/63 |
| 5,099,618 | 3/1992 | Schmid | 451/57 |

FOREIGN PATENT DOCUMENTS

| | | | |
|---|---|---|---|
| 3-003765 | 1/1991 | Japan | 451/63 |
| 3-114657 | 11/1991 | Japan | |
| 94-009945 | 5/1994 | WIPO | 451/446 |

*Primary Examiner*—Timothy V. Eley
*Attorney, Agent, or Firm*—Meschkow & Gresham, P.L.C.; Lowell W. Gresham; Jordan M. Meschkow

[57] ABSTRACT

An apparatus for reconditioning the protective coating of a digital recording disc is provided. The apparatus includes a turntable configured to receive a digital disc, a first motor for rotating the turntable, a turntable support for attaching the turntable to a base, a buffing element, a second motor for rotating the buffing element, a buffing element support for attaching the buffing element to the base, and a protective housing. A method for reconditioning a digital recording disc is also provided. The method involves placing a digital disc on a turntable, rotating the turntable, applying a cutting medium to the disc, rotating a buffing element, and removing material from the disc.

17 Claims, 4 Drawing Sheets

METHOD AND APPARATUS FOR RECONDITIONING DIGITAL RECORDING DISCS

This application is a division of application Ser. No. 08/415,734, filed 3 Apr. 1995 now U.S. Pat. No. 5,593,343.

FIELD OF THE INVENTION

The present invention relates generally to digital recording discs. More specifically, the present invention relates to the repair of digital recording discs. In particular, the present invention relates to the removal of imperfections on the protective coating of digital recording discs.

BACKGROUND OF THE INVENTION

Digital recording discs, including compact discs (CDs), laser discs, and the like, are widely used to store different types of information. Modern digital discs may be formatted for use with audio, video, or computer equipment that reads the data recorded on the discs. The technology associated with digital discs and digital playback equipment is well known to those skilled in the art. Basically, digital information is encoded within a disc beneath an optically transparent protective layer of plastic. A laser beam reads the digital information during playback, and the information is then processed and presented to the user in the form of sound or visual images.

If the protective coating is dirty or damaged, then the laser beam may erroneously track or misread the encoded data. Although modern playback devices include error correction techniques, some scratches or pits on the protective coating of a disc may still cause problems during playback. If such imperfections cause the playback device to consistently malfunction, then the disc itself may be unusable. Due to the high cost of digital discs, its is desirable to repair such damaged discs rather than replace them.

In recent years, the CD reclamation industry has prospered due to the widespread use and longevity of compact discs. However, many used CDs cannot be resold because scratches on the protective coating make them unplayable or visually unappealing. A visually acceptable CD typically has a lustrous metallic appearance, desirably having a surface that is sufficiently smooth to accommodate specular reflections. In many cases, even though a CD is audibly satisfactory, a customer will not purchase it if it contains any visual imperfections. Consequently, to improve CD playability and visual appeal, various methods for treating the surface of a CD have been developed. However, these prior art methods suffer from several disadvantages.

One known method for repairing scratches on a digital disc involves applying a wax or other compound to the damaged surface. The wax fills in the pits or scratches in the protective coating, and partially restores the optical clarity of the disc so that the laser can read the data substantially without error. While this process may restore the playing quality of some discs, the discs often remain aesthetically imperfect because the wax does not actually remove the scratches. As such, there is a need for a reconditioning process that improves the readability and visual appearance of a digital disc.

Another known method for reconditioning digital discs requires sanding or grinding the protective coating until the imperfections are no longer present. Typically, this process involves several sequential, time consuming steps using grinding elements or polishing compounds having varying grades. While this method may effectively repair the protective coating of a single digital disc, it is so time consuming that it is impractical for repairing a large number of discs. Thus, there is also a need for a time-efficient method of repairing digital discs.

Another process for repairing damaged digital discs involves the localized removal of scratches or imperfections from the protective layer of the disc. This process may have limited use because the spot removal of imperfections inherently creates an unbalanced disc. An unbalanced CD (which can spin at rotational speeds of up to 500 RPM) may cause focusing problems, vibrations, and signal distortion during playback. Thus, it is desirable to have a method of repairing a digital disc that does not result in an unbalanced disc.

SUMMARY OF THE INVENTION

Accordingly, an advantage of the present invention is that an improved method and apparatus for reconditioning the protective coating of a digital recording disc are provided that restores both the playback quality and the visual appearance of the disc.

Another advantage of the present invention is that a digital disc can be reconditioned in a uniform manner that maintains the rotational balance of the disc.

A further advantage of the invention is that a large quantity of damaged digital discs can be reconditioned in a time-efficient manner.

The above and other advantages of the present invention are carried out in one form by a method for reconditioning the protective coating of a digital recording disc. The method includes the steps of providing a buffing element configured to recondition the protective coating, rotating the disc at a first rotational speed, rotating the buffing element at a second rotational speed, and removing an amount of material from the protective coating with the buffing element.

The above and other advantages of the present invention are also carried out in another form by an apparatus for reconditioning the protective coating of a digital disc. The apparatus includes a turntable configured to receive the disc, a motor for rotating the turntable, a buffing element configured to recondition the protective coating, and a second motor for rotating the buffing element.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
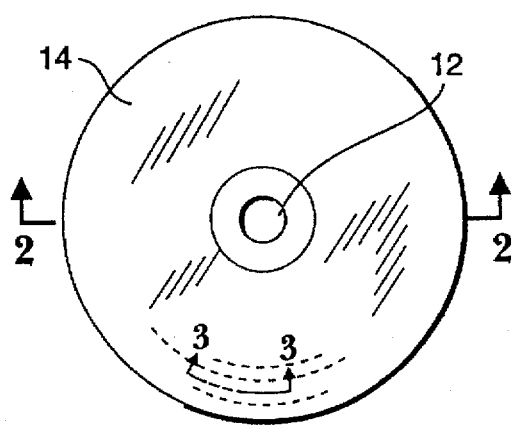
FIG. 1 shows a top view of a compact disc (CD) with a protective coating exposed.
Figure 2:
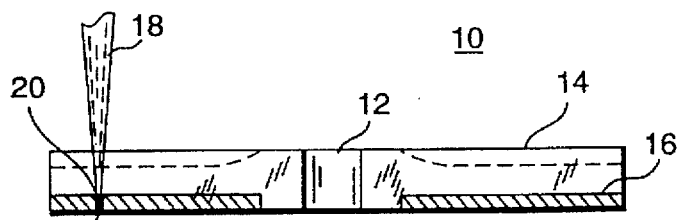
FIG. 2 shows a sectional side view of the CD shown in FIG. 1, as viewed along the line 2—2.
Figure 3:
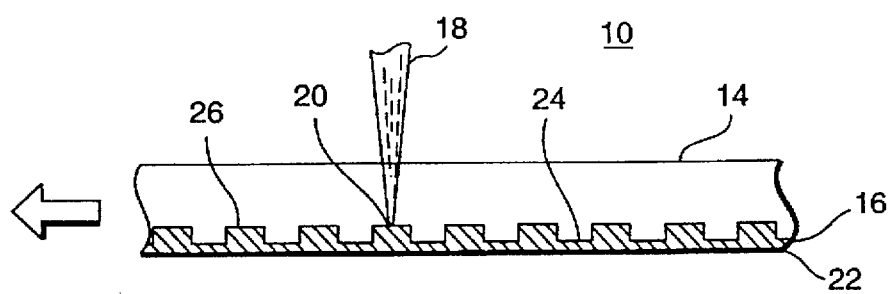
FIG. 3 shows a sectional view of a CD depicting a data track therein, as viewed along the line 3—3 in FIG. 1.

Referring to FIGS. 1–3, a digitally recorded disc 10 is shown in the configuration of a standard audio compact disc (CD). Although the following description is directed to CD applications, the present invention is not limited to digital discs of any specific size or configuration.

According to industry standards, disc 10 has a diameter of approximately 120 mm and a thickness of approximately 1.2 mm. A centerhole 12 has a diameter of approximately 15 mm. Centerhole 12 receives a CD player spindle (not shown) that carries and rotates disc 10 during playback. Disc 10 also includes a protective coating 14 that covers and protects a signal layer 16. Protective coating 14 is typically formed from an optically transparent plastic that allows a CD player laser beam 18 to penetrate protective coating 14 and read the data encoded in signal layer 16. Protective coating 14 is approximately 1.1 mm thick.

As best shown in FIG. 2, signal layer 16, which is exaggerated in the Figures for clarity, does not span the entire area of disc 10. According to industry standards, a circular section within a radius of approximately 23 mm from the center of disc 10 contains no readable data. At a focal point 20, laser beam 18 senses the data encoded in signal layer 16. While disc 10 rotates, laser beam 18 follows a spiral data track 22 that contains a number of pits 24 and a number of lands 26 (see FIG. 1, where the dashed lines represent the path that data track 22 follows). FIG. 3 depicts data track 22 traveling in the direction shown by the arrow. Disc 10 includes a reflective layer (not shown) that reflects a portion of laser beam 18 back to a detector (not shown) within the CD player. The detector detects the transitions between pits 24 and lands 26, which represent digital data corresponding to the audio signal.

Laser beam 18 penetrates through protective coating 14 and focuses on signal layer 16 at focal point 20. Thus, dust and small imperfections on protective coating 14 usually will not affect the tracking of laser beam 18. However, larger surface scratches and defects may cause laser beam 18 to erroneously follow data track 22, or may cause focal point 20 to erroneously detect the transitions between pits 24 and lands 26. When this occurs, the audio output may be distorted. Such distorted output is typically characterized by skipped passages, repeated passages, or inaccessible tracks.

In general, the present invention relates to a method and apparatus for repairing a CD having scratches or imperfections on protective coating 14. Briefly, a preferred method removes an amount of material from protective coating 14. As shown in FIG. 2, an amount of protective coating 14 is removed over signal layer 16 so that the playing quality and physical appearance of disc 10 are restored. A reconditioned CD will have a slightly reduced thickness, as depicted by the dashed lines in FIG. 2. As described above, focal point 20 of laser beam 18 converges on signal layer 16, and thus playback is not affected.

With reference now to FIGS. 4–8, an apparatus 28 according to the present invention for reconditioning disc 10 is illustrated. Apparatus 28 generally includes a turntable 30, a first motor 42 for rotating turntable 30, a turntable support 48, a base 50, a buffing element 52, a second motor 54 for rotating buffing element 52, a buffing element support 58, and a protective housing 66. As mentioned above, apparatus 28 may be configured to repair different sized digital discs, e.g., CD singles, standard CDs, or video laser discs.

Figure 5:
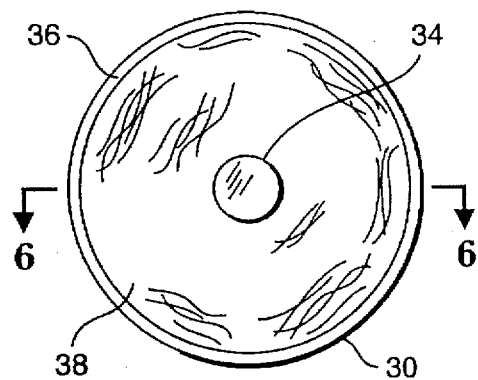
FIG. 5 shows a top view of a turntable with a resilient pad located thereon.
Figure 6:
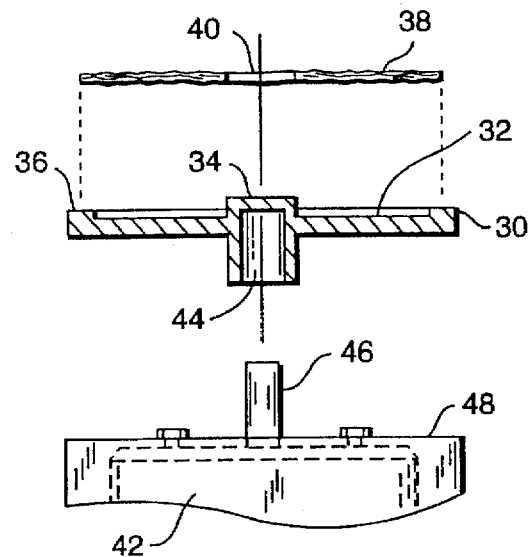
FIG. 6 shows an exploded sectional view of the turntable and resilient pad shown in FIG. 5, as viewed along line 6—6.

With specific reference to FIGS. 5–6, turntable 30 is configured to support and rotate disc 10 (see FIGS. 1–3) during the reconditioning process. Turntable 30 is preferably formed from a rigid material such as aluminum. According to one aspect of the present invention, turntable 30 has a substantially round upper surface 32 for receiving disc 10. Preferably, the diameter of upper surface 32 is approximately equal to the diameter of disc 10, which allows disc 10 to be easily removed from turntable 30. Upper surface 32 includes a spindle 34 configured to receive centerhole 12 of disc 10. Spindle 34 functions to centrally position disc 10 on upper surface 32 during the reconditioning process.

Turntable 30 also includes a circumferential lip 36 that extends above upper surface 32. Preferably, circumferential lip 36 rises approximately 1 mm above upper surface 32. Circumferential lip 36 locates a resilient pad 38 while providing additional support around the perimeter of disc 10. The additional support provided by circumferential lip 36 allows disc 10 to conform to the shape of buffing element 52 during the reconditioning process. This ensures that buffing element 52 removes a substantially uniform amount of material from disc 10.

Pad 38 is formed from a resilient, sponge-like material to provide cushioning for disc 10. Preferably, pad 38 also provides a non-slip surface between disc 10 and upper surface 32. A variety of synthetic and natural rubber sheet materials, and the like, may be used to form pad 38. Pad 38 includes a centerhole 40 that fits around spindle 34. Thus, during operation, spindle 34 extends through centerhole 40 and through centerhole 12 of disc 10. In addition, the diameter of pad 38 is sized such that the outer edge of pad 38 rests on circumferential lip 36. The preferred location and configuration of pad 38 compensates for the curve of buffing element 52 and the flexing of disc 10 during the reconditioning process.

Turntable 30 is connected to first motor 42, which rotates turntable 30 during the reconditioning process. Turntable 30 includes a center cavity 44 configured to receive a stem 46 of first motor 42. Turntable 30 may be held to stem 46 via a set screw (not shown). First motor 42 rotates turntable 30 at a predetermined speed such that disc 10 is not excessively heated during reconditioning. In addition, the rotational speed of first motor 42 is selected to reduce swirling patterns on disc 10 during reconditioning. First motor 42 rotates at a minimum speed of 15 RPM, and at a preferred speed of about 20 RPM.

According to a preferred embodiment, first motor 42 is housed in a turntable support 48. First motor 42 is attached to turntable support 48, and stem 46 extends through turntable support 48. Thus, turntable support 48 provides a foundation for turntable 30 and first motor 42. According to a preferred aspect, turntable support 48 is slidably mounted on base 50 (described below) to expedite the reconditioning process.

Figure 7:
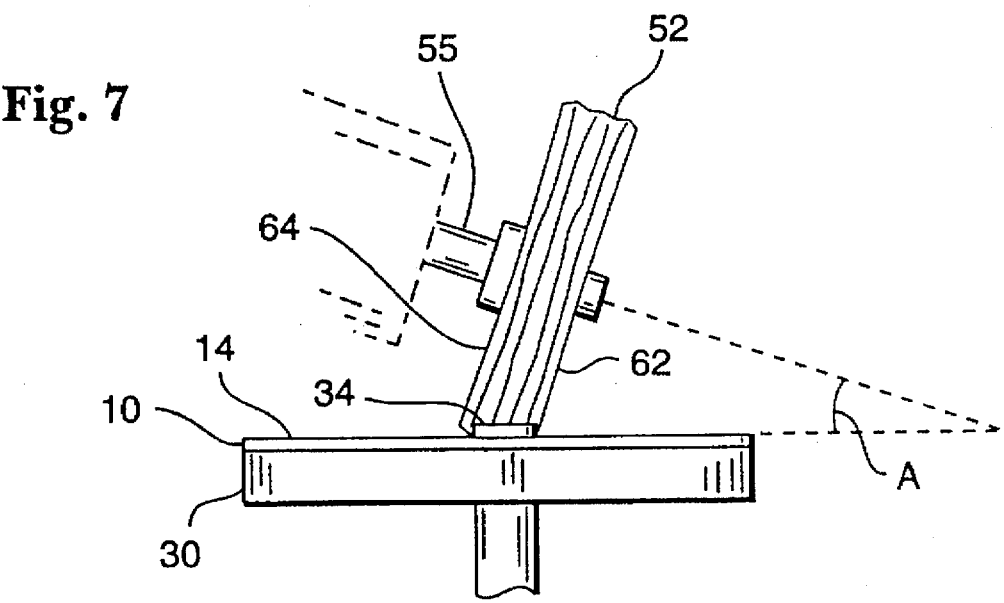
FIG. 7 shows a side view of a turntable and a buffing element aligned to recondition a digital recording disc.
Figure 8:
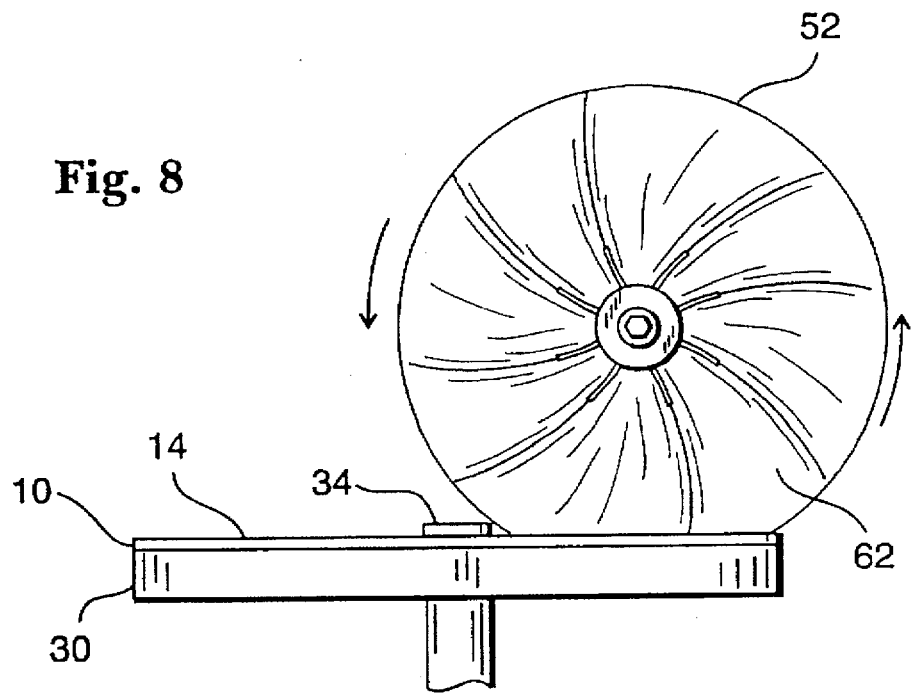
FIG. 8 shows a front view of the turntable and buffing element shown in FIG. 7.

With reference to FIGS. 7–8, buffing element 52 and turntable 30 are illustrated in detail. The actual reconditioning process is carried out by buffing element 52 while disc 10 is rotating on turntable 30. Briefly, buffing element 52 employs a cutting medium to remove a thin layer from protective coating 14 of disc 10. According to the preferred embodiment, buffing element 52 is a cotton cloth wheel having a diameter of about eight inches. For CD applications, the eight inch diameter of buffing element 52 is desirable to produce uniform abrading and polishing of protective coating 14 without moving buffing element 52 translationally relative to disc 10. Of course, other sizes and materials may be utilized according to specific requirements.

Buffing element 52 is attached to second motor 54 via mounting component 55. Second motor 54 rotates buffing element at a second rotational speed. As with first motor 42, the rotational speed of second motor 54 may be selected to minimize the amount of heat generated by the reconditioning process. In addition, the speed of second motor 54 may determine the amount of time required to repair a CD. According to the preferred embodiment, second motor 54 rotates at a speed of about 3400 RPM.

Figure 4:
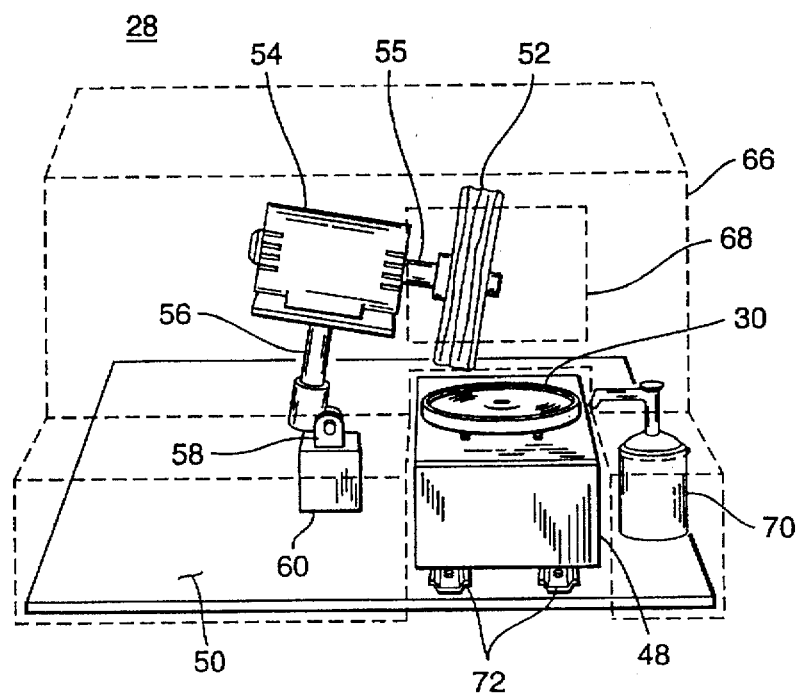
FIG. 4 shows a perspective view of an apparatus according to the present invention for reconditioning a digital recording disc.

Preferably, second motor 54 is mounted to a first end 56 of buffing element support 58 (see FIG. 4). A second end 60 of buffing element support 58 is attached to base 50. Buffing element support 58 provides a stable foundation for second motor 54 and buffing element 52. Preferably, buffing element support 58 is adjustable in a manner discussed below to facilitate a desirable alignment of buffing element 52 relative to disc 10 during operation.

According to a preferred aspect of the present invention, buffing element support 58 is located such that buffing element 52 removes material from protective coating 14 in a radial direction relative to disc 10. Preferably, buffing element 52 rotates in an outwardly radial direction relative to disc 10 (i.e., on a line drawn from the center of disc 10 to the edge of disc 10), which helps to maintain disc 10 on turntable 30. In addition, buffing element support 58 is configured such that the height and the angle of buffing element 52 relative to turntable 30 are adjustable.

The pressure imparted on protective coating 14 by buffing element 52 is dependent upon the height of buffing element 52 relative to turntable 30. Those skilled in this art will realize that the amount of pressure imparted on protective coating 14 affects the abrading process. Thus, an operator of apparatus 28 can adjust the abrading pressure by varying the height of buffing element support 58. In addition, when different sized buffing wheels are used, buffing element support 58 can be adjusted accordingly.

As shown in FIG. 7, buffing element support 58 may be adjusted so that the axis of rotation of buffing element 52 forms an acute angle A with turntable 30. Buffing element 52 has a circumferential width generally defined by a front surface 62 and a rear surface 64. With buffing element 52 angularly aligned as shown, buffing element 52 operates in a preferred manner to efficiently recondition protective coating 14 of disc 10. According to the preferred embodiment, angle A is within the range of 5–25 degrees. Due to angle A, the pressure imparted to disc 10 at front surface 62 is higher than the pressure imparted to disc 10 at rear surface 64. In addition, the surface layers between front surface 62 and rear surface 64 impart correspondingly varied pressures to protective surface 14. Thus, buffing element 52 effectively functions as a variable abrading tool. For example, front surface 62 performs most of the coarse grade abrading while rear surface 64 simultaneously ejects excess buffing media and performs fine grade polishing. This multiple grade "simultaneous" abrading process eliminates the need for multiple grinding steps that utilize grinding elements or compounds having different grades or grits. In addition, due to the rotation of turntable 30, protective coating 14 of disc 10 is uniformly treated. Thus, a CD may be reconditioned quickly and efficiently. Furthermore, the finished protective coating 52 is substantially free of visible swirling or grinding marks. When apparatus 28 is desirably adjusted, scratches may be quickly removed from disc 10 while the outer surface of protective coating 14 is polished to a state of optical clarity and a degree of smoothness that will accommodate specular reflections.

Apparatus 28 may also include protective housing 66 attached to base 50, shown in phantom in FIG. 4. Protective housing 66 encloses buffing element 52, second motor 54, and buffing element support 58 to protect an operator from moving parts and ejected particles. Protective housing 66 may contain a transparent window 68, which allows an operator to view and monitor the reconditioning process as it occurs. According to one aspect of the present invention, protective housing 66 carries a cutting medium dispenser 70 for applying a preferably fluid cutting medium to protective coating 14 prior to reconditioning. Preferably, cutting medium dispenser 70 is located proximate to turntable 30 to expedite the application of the cutting medium.

As shown in FIG. 4, apparatus 28 preferably includes a plurality of sliding rails 72 that slidably attach turntable support 48 to base 50. Sliding rails 72 and protective housing 66 are configured such that an operator can move turntable support 48 to a forward position to place a CD on turntable 30 and apply a cutting medium to protective coating 14. The operator begins the reconditioning process by sliding turntable support 48 (with disc 10 rotating upon turntable 30) under buffing element 52.

Figure 9:
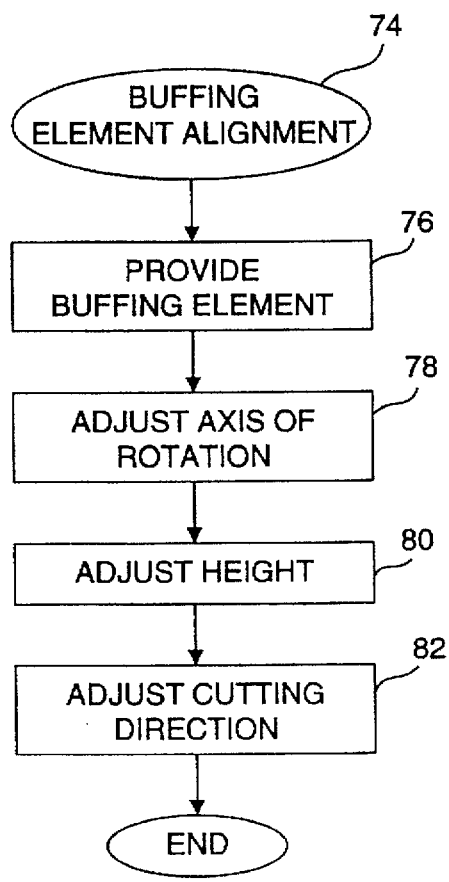
FIG. 9 is a flow diagram of a buffing element alignment procedure according to the present invention.

With reference now to FIG. 9, a flow diagram illustrates a buffing element alignment procedure 74, which is performed before disc reconditioning procedure 84 commences. The above description should be referred to for details of apparatus 28, which is used in the following procedures. Alignment procedure 74 begins with a task 76, which provides buffing element 52 that is configured to recondition digital discs. As described above in connection with apparatus 28, buffing element 52 is attached to second motor 54. Following task 76, a task 78 is performed.

During task 78, the axis of rotation of buffing element 52 is adjusted so that angle A is between 5 and 25 degrees. After task 78, a task 80 is performed. Task 80 involves adjusting the height of buffing element 52 relative to turntable 30 such that buffing element 52 will impart an adequate pressure upon protective coating 14 of disc 10 during disc reconditioning procedure 84. Following task 80, a task 82 is performed to adjust the cutting direction or track of buffing element 52 such that it will remove material from protective coating 14 in a radial direction relative to disc 10. After task 82, alignment procedure 74 ends. As described above in relation to apparatus 28, buffing element 52 is adjustable via buffing element support 58. Proper adjustment may be verified by visual inspection of a reconditioned CD.

Those skilled in the art will appreciate that tasks 78, 80, and 82 may be performed in any order, and that the present invention is not limited to the particular order illustrated. In addition, each of steps 78, 80, and 82 may be performed separately or in conjunction with one another, as necessary. Furthermore, alignment procedure 74 need not be repeated each time a new CD is reconditioned. Rather, alignment procedure 74 is preferably only performed until a satisfactory alignment is achieved. Thereafter, a large quantity of CDs may be treated before alignment procedure 74 must be performed again.

Figure 10:
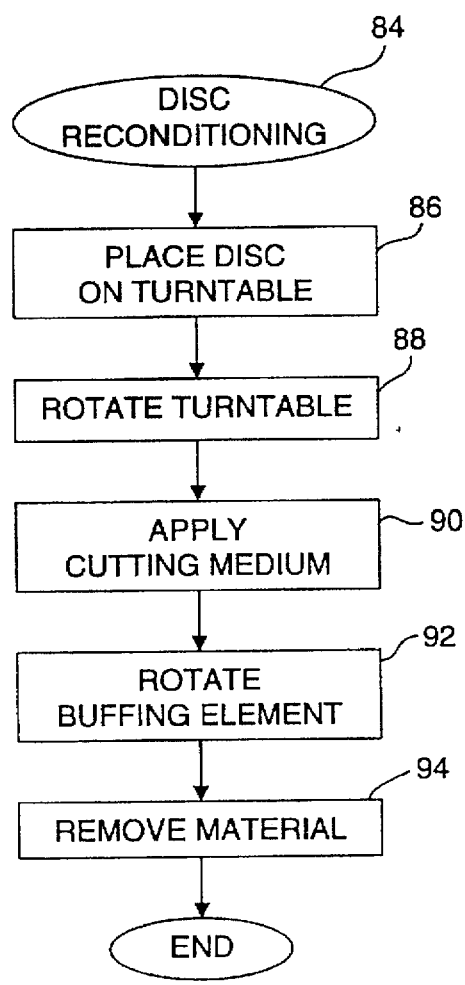
FIG. 10 is a flow diagram of a disc reconditioning procedure according to the present invention.

With reference now to FIG. 10, a flow diagram illustrates a disc reconditioning procedure 84 according to the present invention. Although the described procedure implements apparatus 28 described above to recondition CDs, the present invention is not limited to the use of any particular device or the treatment of CDs.

Disc reconditioning procedure 84 begins with a task 86. Task 86 involves placing disc 10 upon turntable 30. Disc 10 is placed upon turntable 30 with protective coating 14 exposed. Following task 86, a task 88 is performed. Task 88 involves rotating turntable 30 at a predetermined speed. As discussed above, in the preferred embodiment turntable 30 rotates at a speed of approximately 20 RPM. After task 88, a task 90 is performed.

During task 90, a cutting medium is applied to protective coating 14 of disc 10. The cutting medium is used to facilitate the removal of material by buffing element 52. In addition, the cutting medium provides lubrication and thermal protection between buffing element 52 and protective coating 14 of disc 10. According to the present invention, the cutting medium is an oil based liquid containing diatomaceous earth. Preferably, the cutting medium is intended for use with the type of plastic generally associated with digital disc construction. A suitable cutting medium is commercially available under the name of Meguiar's M17 Professional Plastic Cleaner. Of course, other liquids and compounds may also be suitable for this use. Following task 90, a task 92 is performed.

Task 92 involves rotating buffing element 52 at a predetermined speed. As discussed above, in the preferred embodiment buffing element 52 rotates at a speed of approximately 3400 RPM. Following task 92, a task 94 is performed to remove a sufficient amount of material from protective coating 14. As described above in connection with apparatus 28, task 94 is initiated by sliding turntable support 48 under buffing element 52 while both turntable 30 and buffing element 52 are rotating. Task 94 is performed until turntable 30 has rotated through preferably several, but at least one, revolution. This ensures that a substantially uniform amount of material is circumferentially removed from disc 10, which maintains the rotational balance of the reconditioned disc. As discussed above with respect to apparatus 28 and tasks 78, 80, and 82, the alignment of buffing element 52, particularly angle A between turntable 30 and the axis of rotation of buffing element 52, ensures that disc 10 is reconditioned efficiently during task 94. Following task 94, disc reconditioning procedure 84 ends.

Task 94 may continue or be repeated until disc 10 is adequately treated. Disc 10 may be inspected to ensure that scratches or imperfections are no longer visible. Utilizing the preferred embodiment, most CDs can be adequately reconditioned in about thirty seconds or less. Of course, this time may vary depending upon the severity of the scratches or the number of imperfections on protective coating 14.

Those skilled in the art will realize that the specific order of the tasks in disc reconditioning procedure 84 may not be critical to the present invention. For example, task 92 may rotate buffing element 52 before tasks 86, 88, or 90 are performed. In addition, because individual discs may require more or less reconditioning, task 90 or task 94 may have to be repeated before disc 10 is repaired.

In summary, the present invention provides an improved apparatus and method for reconditioning the protective coating of a digital recording disc. The apparatus restores the playback capability and the visual appearance of a damaged disc, while maintaining the rotational balance of the disc. In addition, the present invention provides an apparatus that can recondition a large quantity of used digital discs in a time-efficient manner.

The above description is of preferred embodiments of the present invention, and the invention is not limited to the specific embodiments described and illustrated. For example, as mentioned above, the present invention is not limited to an apparatus and method for reconditioning CDs. Indeed, the scope of the present invention is intended to include any size or format of digital recording discs. As another example, various rotational speeds and alignment angles are described for only one embodiment of the present invention, and the specific values are not to be construed in a limiting manner. Furthermore, many variations and modifications will be evident to those skilled in this art, and such variations and modifications are intended to be included within the spirit and scope of the invention, as expressed in the following claims.

What is claimed is:

1. A method for reconditioning a protective surface of an optically-read digital recording disc, said method comprising the steps of:

rotating said optically-read disc at a first rotational speed;

providing a buffing element configured to recondition said protective surface;

rotating said buffing element at a second rotational speed; and removing an amount of material from said protective surface with said buffing element as said disc is rotated through at least one revolution.

2. A method according to claim 1, wherein said buffing element has an axis of rotation, and said method further comprises the step of aligning said axis of rotation of said buffing element to form an angle with said protective surface, said aligning step occurring before said removing step.

3. A method according to claim 2, wherein said buffing element has a circumferential width, and, during said removing step, the pressure imparted by said buffing element upon said protective surface varies across said circumferential width.

4. A method according to claim 1, wherein said buffing element removes material from said protective surface in a substantially radial direction relative to said disc.

5. A method according to claim 1, wherein said buffing element reduces the thickness of said protective surface by a substantially uniform amount.

6. A method according to claim 1, further comprising the step of applying a cutting medium to said protective surface, said applying step occurring before said removing step.

7. A method according to claim 1, wherein said buffing element rotating step rotates said buffing element in a substantially outward radial direction with respect to said disc so that said buffing element removes material from said protective surface in a substantially outward radial direction relative to said disc.

8. A method as claimed in claim 1 wherein said buffing element providing step comprises the step of configuring said buffing element to simultaneously perform relatively coarse and relatively fine grade abrading upon said protective surface.

9. A method according to claim 1, wherein:

said buffing element has a circumferential buffing surface located around said buffing element; and said removing step comprises the step of bringing said optically-read disc into contact with said circumferential buffing surface of said buffing element.

10. A method for reconditioning a protective surface of an optically-read digital recording disc, said method comprising the steps of:

providing a buffing element configured to recondition said protective surface;

placing said optically-read disc upon a turntable configured to receive said disc with said protective surface exposed;

rotating said turntable at a first rotational speed;

rotating said buffing element at a second rotational speed; and removing an amount of material from said protective surface with said buffing element as said turntable rotates said disc through at least one revolution.

11. A method according to claim 10, further comprising the steps of:

aligning the axis of rotation of said buffing element to form a predetermined angle with said turntable, said aligning step occurring before said removing step; and adjusting the height of said buffing element relative to said turntable such that said buffing element imparts a predetermined pressure upon said protective surface during said removing step, said adjusting step occurring before said removing step.

12. A method according to claim 10, wherein said buffing element is translationally fixed and said removing step is initiated by urging said turntable under said buffing element.

13. A method as claimed in claim 10, additionally comprising the step of orienting said turntable relative to said buffing element so that said removing step removes said material in a substantially radial direction relative to said turntable.

14. A method as claimed in claim 13 wherein said buffing element rotating step is configured so that said removing step removes said material in a substantially outward radial direction relative to said turntable.

15. A method according to claim 10, wherein said buffing element rotating step rotates said buffing element in a substantially outward radial direction with respect to said turntable so that said buffing element removes material from said protective surface in a substantially outward radial direction relative to said disc.

16. A method as claimed in claim 10 wherein said buffing element providing step comprises the step of configuring said buffing element to simultaneously perform relatively coarse and relatively fine grade abrading upon said protective surface.

17. A method according to claim 10, wherein:

said buffing element has a circumferential buffing surface located around said buffing element; and said removing step comprises the step of bringing said optically-read disc into contact with said circumferential buffing surface of said buffing element.

\* \* \* \* \*